Oct. 18, 1932.    O. P. HAEGELE ET AL    1,882,815
APPARATUS FOR TESTING ELECTRICAL COILS
Filed March 9, 1929    2 Sheets-Sheet 1
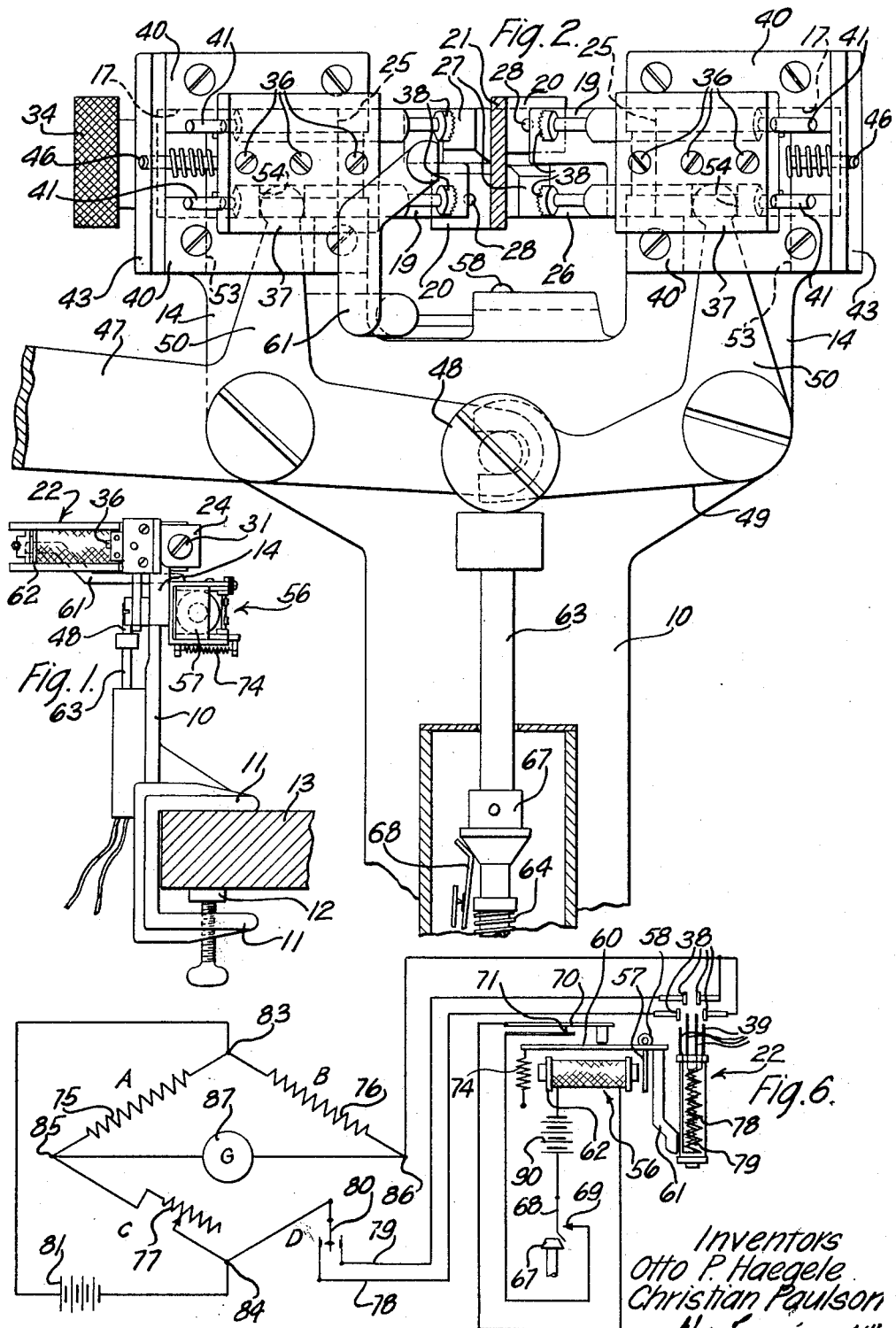
Inventors
Otto P. Haegele
Christian Paulson
By [signature] Att'y.

Oct. 18, 1932.  O. P. HAEGELE ET AL  1,882,815
APPARATUS FOR TESTING ELECTRICAL COILS
Filed March 9, 1929    2 Sheets-Sheet 2
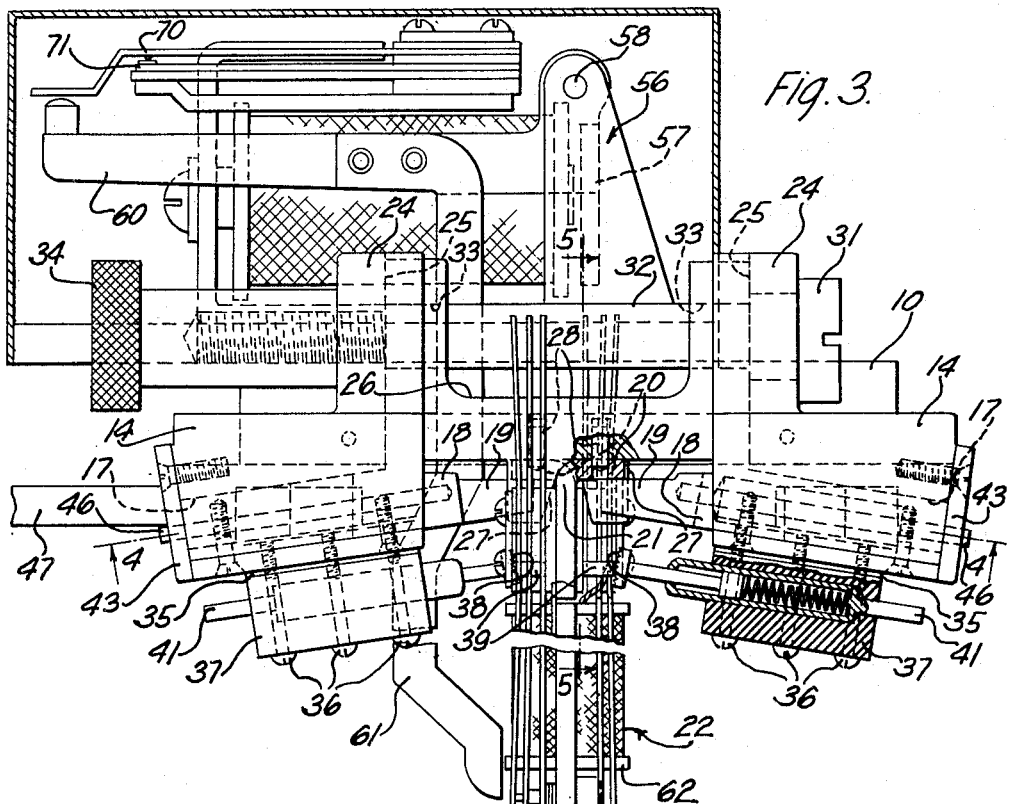
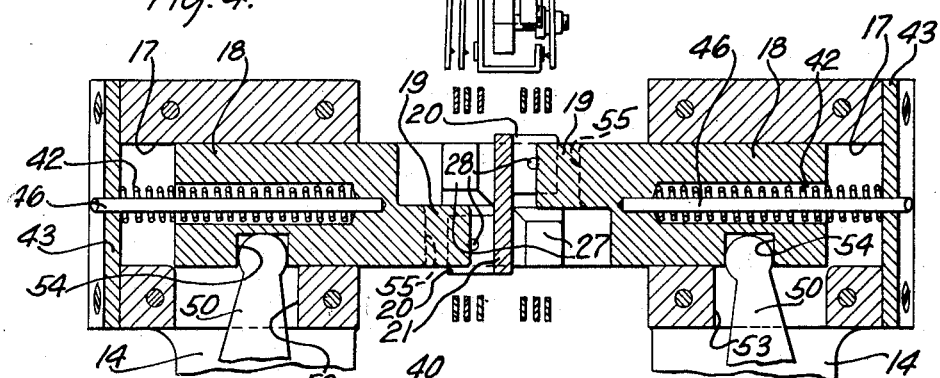
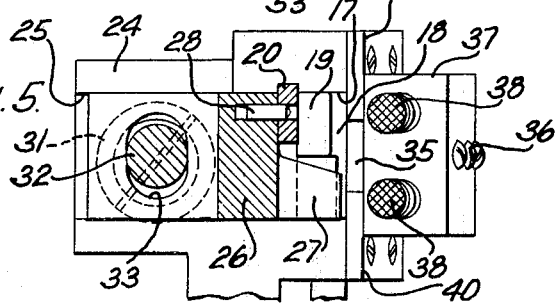
Inventors
Otto P. Haegele
Christian Paulson
By /s/ Att'y.

Patented Oct. 18, 1932

1,882,815

UNITED STATES PATENT OFFICE

OTTO PAUL HAEGELE, OF BERWYN, AND CHRISTIAN PAULSON, OF CHICAGO, ILLINOIS, ASSIGNORS TO WESTERN ELECTRIC COMPANY, INCORPORATED, OF NEW YORK, N. Y., A CORPORATION OF NEW YORK

APPARATUS FOR TESTING ELECTRICAL COILS

Application filed March 9, 1929. Serial No. 345,646.

This invention relates to apparatus for testing electrical coils, and more particularly to apparatus for testing completed electrical coils.

This invention has been found particularly useful in testing electrical coils after complete assembly thereof and before being shipped or put into service. In some instances it has been found that electrical coils which apparently were satisfactory according to the usual method of testing performed during the winding thereof or immediately thereafter developed defects, such as short circuits or broken connections when they were placed in service. One explanation of the foregoing condition which has been fairly well established by experiments is that in a great many cases these defects later developed in the coils were caused by vibration or other shocks to which the coils were subjected after completion and before being put into service either during transit or while being installed.

The object of this invention is to provide apparatus for detecting defects in electrical coils while subjected to conditions approximating those encountered in transit, installation or service.

In order to attain this and other objects of the invention, completed electrical coils are subjected to vibration while the winding of the coil is connected to a suitable testing circuit for indicating any defects developed during the vibration, such as short circuits or broken connections. An apparatus embodying means by which the method may be practiced comprises coil clamping elements controlled by a manually operable lever which simultaneously therewith causes spring contactors to connect electrically with the terminal of the coil for including the winding of the coil in a testing circuit. The movement of the hand lever to a clamping position also controls the closure of a circuit which extends to an electromagnet having a pivotal oscillatory arm. This arm when actuated, because of the intermittent energization of the electromagnet, subjects the coil to impacts approximating those which the coil might encounter previously to being placed in service, and consequently should any of the connections be improperly soldered or adjacent turns of the winding be insufficiently insulated, these and other defects will be indicated through the operation of the connected testing circuit.

Other objects and advantages of this invention will be apparent from the following detailed description considered in connection with the accompanying drawings, wherein Fig. 1 is a side view of an apparatus embodying the features of this invention and capable of being used in the practice of the method;

Fig. 2 is a fragmentary enlarged elevational view, partly in section, looking toward the right of Fig. 1, with a fragmentary portion of a coil in a clamped position;

Fig. 3 is a plan view of Fig. 2, partly in section;

Figs. 4 and 5 are detail vertical sectional views taken on the lines 4—4 and 5—5, respectively, of Fig. 3, and Fig. 6 is a schematic diagram of a completed electrical coil about to be connected to a testing circuit and a circuit including electromagnetic means for subjecting the coil to vibration when connected to the testing circuit.

Referring now to the drawings in detail wherein like reference numerals indicate similar parts, and particularly to Fig. 1, an upright frame 10 for supporting the coil clamping and vibration imparting apparatus at its lower end is provided with horizontally extending parallel spaced arms 11, the lower arm being equipped with a thumb screw clamp 12 whereby the apparatus may be secured to a bench or other main support 13. The upper end of the frame 10 (Fig. 2) is U-shaped, providing a pair of vertically extending spaced arms 14 formed in their front faces with horizontal channels or guideways 17, slightly angularly disposed in opposite direction, as viewed in Fig. 3, and carrying slides 18, each provided upon its inner end with a vertically relatively offset clamping jaw 19 for engagement with similarly arranged mounting lugs 20 formed integral with a core end 21 of a coil 22 to be tested. The rear surfaces of the arms 14 are each provided with a right angular extension 24, with the opposite inner surfaces thereof lying flush with similar surfaces of the arms 14. Formed in the opposed inner surfaces of the arms 14 and extensions 24 thereof are horizontal guideways 25 for supporting opposite arms of a U-shaped slide 26, the purpose of which will hereinafter be described, the forward vertical surface of the slide 26 spans the space between the arms 14 and is provided with a pair of forwardly extending lugs 27 (Figs. 3, 4 and 5).

The lugs 27 are vertically and horizontally offset relatively to each other and upon their inner vertical and horizontal surfaces are beveled as clearly shown in Fig. 4 for facilitating the positioning of the core end 21 of the coil therebetween when clamping the coil in the apparatus, at which time the inner opposed surfaces of the clamping jaws 19 are retracted sufficiently from the position thereof shown in Fig. 4 to permit the core end 21 with the lugs 20 to be freely inserted between the beveled inner vertical and horizontal surfaces of the lugs 27. It will be apparent that the beveled surfaces of the lugs 27 serve to center the core end 21 in all directions when inserting it into the apparatus and upon the rear surface of the core end 21 engaging the forward surface of the U-shaped slide 26, predeterminedly arranged pins 28 (Figs. 3, 4 and 5) projecting therefrom enter apertures similarly arranged in the mounting lugs 20 of the core end 21, thus further aligning the coil in a testing position. When the jaws 19 are moved inwardly from a retracted position to their clamping position (Figs. 3 and 4) they move along the path provided by the angularly disposed guideways 17 and since the rear surfaces of the jaws 19 are formed parallel to the forward surfaces of the slide 26 and the lugs 20 they parallelly engage the surfaces of the lugs while moving angularly thereto and thus effectively clamp the lugs against the forward surface of the slide. This clamping action of the jaws 19 against the lugs 20 it will be obvious is of particular advantage when slight variations in the thickness of the lugs 20 occur.

When a type of coil 22 is to be tested having mounting lugs 20 which are of an extremely different thickness than the lugs 20, shown in the drawings, the slide 26 is adjusted along the guideways 25 to vary the distance between the opposed cooperating parallel surfaces of the slide 26 and the jaws 19. This adjustment of the slide 26 is accomplished by the rotation of a screw 31 having an eccentric portion 32 (Fig. 5) extending through vertically extending slots 33 provided in the opposite arms of the slide 26 with shouldered concentric end portions of the screw journaled in apertures provided in the extensions 24 of the arms 14. The screw 31 at its left shouldered end (Fig. 3) is threaded and extends through the corresponding extension 24 for the reception of a thumb nut 34 provided for clamping the screw 31 in its adjusting position. Referring to Fig. 5 it will be apparent that upon causing the screw 31 to be rotated clockwise or counterclockwise the slide 26 will be moved toward the right or left, respectively, and thereby lessen or increase, respectively, the distance between the opposed cooperating parallel surfaces of the slide 26 and the jaws 19.

Fixed to each of the slides 18 upon forward vertical surfaces of tongues 35, thereof, as viewed in Figs. 2, 3 and 5, by means of screws 36 is a block 37 of insulation, each block carrying a pair of resiliently mounted contactors 38 to connect electrically with winding terminals 39 of the coil for including the windings of the coil in a testing circuit (Fig. 6). Secured to each of the arms 14 above and below the tongue 35 of the slide 18 thereof are plates 40 which serve to provide a guide wall for the slide 18 in the guideway 17 and the integral tongue 35 thereof, as well as a cover for the forward side of the arm 14. The particular coil 22 shown in the drawings has a double winding which is the reason for providing two pairs of winding terminals 39 and contactors 38, the windings being successively connected to the testing circuit by means to be hereinafter referred to in connection with the testing circuit. In the case of a single winding coil only one of the contactors 38 operatively connected to each of the slides 18 will make contact with the terminals 39 of the coil, the other pair being idle. Outer terminal ends 41 of the contactors 38 project from the blocks 37 for connection to the testing circuit. The slides 18 are each normally urged inwardly toward each other as clearly shown in Fig. 4 by compression springs 42 arranged to engage at opposite ends with the end wall of an aperture provided in the slide 18 and an outer end cover plate 43 fixed to the arm 14, the spring surrounding a centering and guide pin 46 fixed at one end to the slide 18 and its opposite end reciprocably mounted in an aperture in the cover plate 43.

A manually operable lever means is provided for retracting the slides 18 carrying the clamping jaws 19 and the contactors 38 outwardly against the action of the springs 42 when the coil 22 is mounted in a testing position. A hand lever 47 pivoted to the left arm 14 of the frame 10 (Fig. 2) is provided on its inner short arm with a shouldered headed screw 48, the longitudinal axis of the screw being disposed directly below and centered with the core end 21 of the coil 22. Similarly arranged and pivoted upon the right arm 14 of the frame 10 in a manner similar to that of the hand lever 47 upon the left arm is a lever 49, a lower horizontal arm of which at its outer end is bifurcated for operatively engaging the shoulder of the screw 48. The levers 47 and 49 are each provided with a vertically extending arm 50 which at its upper end (Figs. 2 and 4) extends through a slot 53 formed in the lower wall of the guideway 17 provided in the arm 14 of the frame 10 and into a notch 54 provided in the lower surface of the slide 18. Upon a counterclockwise movement of the hand lever 47 about its pivot (Fig. 2) it will be obvious, due to the operative connection of the screw 48 carried by the inner end of the lever 47 with the bifurcated end of the lever 49, that the vertical arms 50 of the levers will simultaneously move outwardly and carry with them the slides 18 with the jaws 19 and the attached contactors 38. This outward movement of the slides 18 is limited by the arms 50 engaging the outer vertical end walls of the slots 53 and when in this position the inner opposed ends of the clamping jaws 18 will have cleared the outer ends of the lugs 20 of the core end 21 as indicated in Fig. 4 by the broken line 55, the contactors 38 also being moved such a distance that they will clear the outer sides of the coil and thus the coil may be freely removed from the apparatus.

Fixed to the rear surface of the frame 10, as viewed in Fig. 3, and the right surface thereof (Fig. 1) is an electromagnet 56 provided with an armature 57 pivoted at 58. Secured to a contact breaking extension 60 of the armature 57 by riveting or otherwise, is an irregular shaped arm 61 terminating with a side surface thereof at its free end adjacent a head 62 at the end of the coil 22 opposite the coil end which is clamped by the jaws 19. The arm 61 when actuated because of an intermittent energization of the electromagnet 56, in a manner to be presently described, subjects the coil 22 to vibration, due to impacts of the free end of the arm directed laterally against the head 62 of the coil.

Resiliently bearing upwardly against the peripheral surface of the head of the screw 48 is an electrical contact closing plunger 63 reciprocably mounted on the frame 10 and urged upwardly by a compression spring 64 engaging at opposite ends an annular shoulder on the plunger and an end surface of a journal (not shown) provided for the plunger. An insulating member fixed to the plunger and provided with a tapered annular surface 67 at all times engages a resilient contact spring 68 cooperating with a companion contact spring 69, the two contact springs being suitably mounted at their lower ends in an insulating block (not shown). When the contact springs are in engagement, as shown in Fig. 2, wherein a coil 22 is clamped in a testing position, a circuit is closed, which extends to the electromagnet 56 for energizing the same, thus drawing the armature 57 over and about its pivot 58 in a clockwise direction (Fig. 3). This movement of the armature 57 opens a pair of normally closed contacts 70 and 71 included in the circuit to the electromagnet 56, the contact 70 being mounted on a resilient spring operatively engaged by the free end of the armature extension 60. Thus upon completion of the clockwise movement of the armature 57 the circuit through the contacts 70 and 71 is opened and the electromagnet 56 is deenergized, the armature being quickly retracted in a counterclockwise direction about its pivot 58 by a tension spring 74 attached to the armature 57 to again close the contacts 70 and 71 and cause another energization of the electromagnet 56 and continuing intermittently until the contact springs 68 and 69 are separated again. Each time the armature 57 is retracted by the spring 74 the arm 61 fixed to the extension 60 of the armature 57 laterally engages the head 62 of the coil 22 and subjects it to a sharp impact and sets up a vibratory motion throughout the coil, the impacts approximating those which the coil might encounter previously to being placed in service. It will be apparent when the hand lever 47 is swung downwardly against the action of the compression springs 42 when retracting the clamping jaws 19 to release a coil 22 that the inner end of the hand lever 47 will move upwardly, the resiliently mounted plunger 63 following and thus the resilient contact spring 68 is permitted to break the circuit through the companion contact 69 to the electromagnet. Upon positioning another coil 22 in position between the clamping jaws 19 and releasing the hand lever 47 it will move upwardly, due to the springs 42, and simultaneously therewith the free inner end of the lever will move downwardly, depressing the resiliently mounted plunger 63 and closing the contact springs 68 and 69 again to close the circuit to the electromagnet 56. It will be understood from the description hereinbefore given that simultaneously with the movement of the jaws 19 to clamp or release the coil 22 along with the closing or opening of the circuit to the electromagnet 56 the resiliently mounted contactors 38 movable with the jaws 19 will engage or disengage the coil winding terminals 39, which contactors are connected to a testing circuit (Fig. 6) which will now be described.

Fig. 6 illustrates in schematic diagrammatic form an apparatus and its associated electrical circuit and an electrical Wheatstone bridge circuit, which are used for testing completed electrical coils. In this diagram A and B represent the usual fixed ratio arms comprising resistances 75 and 76, C a variable arm including an adjustable resistance 77, and D the unknown resistance arm of the bridge circuit comprising one or the other of the windings 78 and 79 of the coil 22 to be tested for short circuits or broken connections. The windings 78 and 79 are connected to the bridge circuit one at a time by means of a switch 80. A source of current 81 is connected to the points 83 and 84, while the circuit between the points 85 and 86 includes a galvanometer 87 which is used in a well known manner to indicate to the operator when the bridge circuit is balanced.

Referring to Fig. 6 the method of testing the electrical coil 22 comprises two windings 78 and 79 when it is clamped in position upon the apparatus by the jaws 19 by the operation of the hand lever 47 as hereinbefore described is as follows: Before the testing operation takes place it is to be understood that the variable arm C of the bridge circuit has been set by adjusting the resistance 77 to correspond to the resistance of the coil being tested.

Upon the clamping of the coil 22 the winding terminals 39 are connected electrically to the contactors 38 and simultaneously therewith the contact springs 68 and 69 are engaged to complete a circuit from a source of current 90 to intermittently energize the electromagnet 56, in the manner hereinbefore described, thus causing the coil 22 to be subjected to vibration due to impacts by the arm 61 directed laterally against the head 62 of the coil. While the coil 22 is being subjected to vibration the operator connects the windings 78 and 79 successively to the bridge circuit by the operation of the switch 80 and should any of the connections of the coil be improperly soldered they will develop into a broken circuit, due to the impacts of the arm 61, or should adjacent turns of the winding be insufficiently insulated to cause short circuits these and other defects will be immediately known to the operator by the unbalance of the bridge circuit indicated by the deflection of the needle of the galvanometer 87, in a well known manner. If no defects develop in the coil while being subjected to vibration the bridge circuit will be in balance and this will be indicated to the operator by reading the galvonometer.

Although the invention as herein shown and described is particularly well adapted for testing electrical coils of a particular type, it should be understood that the novel features thereof are capable of other applications and should be limited only by the scope of the appended claims.

What is claimed is:

1. In an apparatus for testing electrical coils, an electrical test circuit, means for clamping a coil at one end in a predetermined testing position and connecting the test circuit with the winding of the coil, an oscillatory member having its free end disposed laterally of the opposite end of the coil, and means for oscillating the member to and from engagement with the coil for subjecting the clamped coil to vibration.

2. In an apparatus for testing electrical coils, an electrical test circuit, means operable for supporting a coil in a predetermined test position with the winding thereof connected to the circuit, and means controlled in response to an operation of the coil supporting means for subjecting the coil to vibration.

3. In an apparatus for testing electrical coils, an electrical test circuit, reciprocably operated means for supporting a coil in a predetermined test position with the winding thereof connected to the circuit, and a second electrical circuit including an electro-responsive device controlled in response to an operation of the reciprocable means for subjecting the coil to vibration.

4. In an apparatus for testing completed electrical coils, an electrical test circuit, a plurality of clamping elements for supporting a coil in a predetermined test position with the winding thereof connected to the circuit, means for simultaneously operating the elements in opposite directions either to clamp or release the coil, and means controlled in response to an operation of the means for operating the elements to clamp the coil for subjecting the coil to vibration.

5. In an apparatus for testing completed electrical coils, an electrical test circuit, a plurality of reciprocably operated clamping elements for supporting a coil in a predetermined test position, electrical contacts movable with the elements and arranged to contact with terminal portions of the coil winding to connect the same to the test circuit when the coil is clamped, and means controlled in response to an operation of the elements to clamp the coil for subjecting the coil to vibration.

In witness whereof, we hereunto subscribe our names this 27th day of February, A. D. 1929.

OTTO PAUL HAEGELE.
CHRISTIAN PAULSON.